(12) United States Patent
Kurane

(10) Patent No.: US 7,417,669 B2
(45) Date of Patent: Aug. 26, 2008

(54) DIGITAL CLAMPING CIRCUIT AND DIGITAL CLAMPING METHOD

(75) Inventor: Haruhisa Kurane, Suwa (JP)

(73) Assignee: Seiko Epson Corporation (JP)

( * ) Notice: Subject to any disclaimer, the term of this patent is extended or adjusted under 35 U.S.C. 154(b) by 644 days.

(21) Appl. No.: 10/769,731

(22) Filed: Jan. 30, 2004

(65) Prior Publication Data

US 2004/0252204 A1 Dec. 16, 2004

(30) Foreign Application Priority Data

Jan. 31, 2003 (JP) ............................. 2003-024647

(51) Int. Cl.
*H04N 5/228* (2006.01)
*H04N 9/64* (2006.01)

(52) U.S. Cl. .................................. 348/222.1; 348/243

(58) Field of Classification Search .............. 348/222.1, 348/241, 243
See application file for complete search history.

(56) References Cited

U.S. PATENT DOCUMENTS

| 6,005,615 A * | 12/1999 | Tsuda ........................ 348/243 |
| 6,525,764 B2 * | 2/2003 | Kondo et al. .................. 348/96 |
| 6,700,609 B1 * | 3/2004 | Abe ........................... 348/243 |
| 6,735,913 B2 * | 5/2004 | Sanders et al. ................ 52/284 |
| 7,081,921 B2 * | 7/2006 | Nitta et al. ............... 348/229.1 |

FOREIGN PATENT DOCUMENTS

| JP | 62-117480 | 5/1987 |
| JP | 05-153428 | 6/1993 |
| JP | 05-60042 | 8/1993 |
| JP | 05-244490 | 9/1993 |
| JP | 3143193 | 12/2000 |
| JP | 2002-125138 | 4/2002 |
| JP | 2003-209713 | 7/2003 |
| KR | 1994-17798 | 7/1994 |

OTHER PUBLICATIONS

Communication from Korean Patent Office regarding corresponding application.

* cited by examiner

*Primary Examiner*—Tuan Ho
*Assistant Examiner*—Tuan H Le
(74) *Attorney, Agent, or Firm*—Harness, Dickey & Pierce, P.L.C.

(57) ABSTRACT

A digital clamping circuit and a digital clamping method are provided which can effectively use the dynamic range of an output signal in black-level correction. When subtracting a black level serving as a reference value from an output signal of an analog front end circuit, a digital clamp circuit permits the production of a negative value, amplifies the dynamic range including the-negative value to increase the dynamic range, adds a predetermined value to the resulting signal, and performs clipping. As a result, the dynamic range of the digital clamp circuit is increased, so that the dynamic range of an output signal can be effectively utilized. Thus, processing that makes good use of a wider dynamic range can be performed in image processing at a subsequent stage, so that image quality can be improved.

10 Claims, 5 Drawing Sheets

DIGITAL CLAMPING CIRCUIT AND DIGITAL CLAMPING METHOD

BACKGROUND OF THE INVENTION

1. Technical Field of the Invention

The present invention relates to a digital clamping circuit and a digital clamping method for correcting the black level of an imaging signal in an electronic camera.

2. Description of the Related Art

Conventionally, electronic cameras that capture an image of an object with image-capturing elements or the like have been used, and such electronic cameras perform black-level correction to determine brightness for a captured image.

DC components of an output signal vary due to variations in power-supply voltage or temperature of image-capturing elements or an analog front-end (AFE) circuit. Thus, with respect to the variation of the DC components, the black-level correction is a process for invariably making the black level (DC components) constant.

Techniques described in Japanese Unexamined Patent Application Publications Nos. 62-117480 and 5-153428 are known as being relevant to a black-level correction method.

A typical black-level correction method which has been conventionally used will be described below.

First, a sensor including a group of image-capturing elements is shielded against light so that no light enters peripheral portions thereof. Then, an average value of sensor outputs from the regions (light-shielding regions) in which light-shielding is provided is determined so as to serve as a reference value, and a sensor-output value of a region (light-receiving region) in which no light-shielding is provided is compared with the reference value to determine the brightness of the light-receiving regions.

At this point, since the sensor outputs of the light shielding regions vary due to a power-supply voltage, temperature, or the like, a correction device (a black-level correction device) for performing correction (black-level correction) on the sensor outputs of the light shielding regions are generally used.

Figure 5:
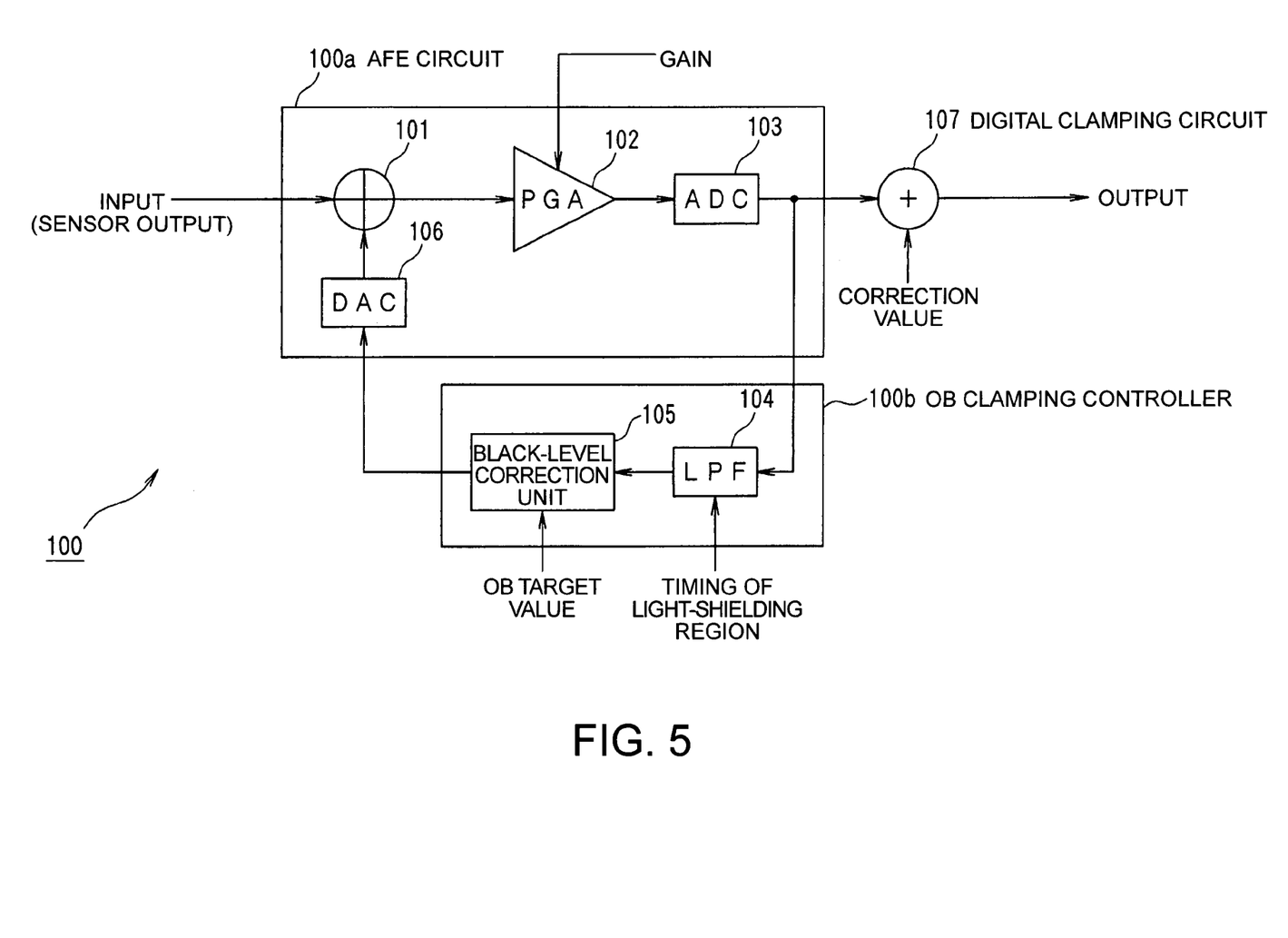
FIG. 5 is a diagram of the known black-level correction device 100 that is provided in an electronic camera.

FIG. 5 is a diagram of a known black-level correction device 100 that is provided in an electronic camera. Referring to FIG. 5, the black-level correction device 100 includes an OB clamping circuit (optical black clamping circuit) 101, a PGA (programmable gain amplifier) 102, an ADC (analog-to-digital converter) 103, an LPF (low-pass filter) 104, a black-level correction unit 105, a DAC (digital-to-analog converter) 106, and a digital clamping circuit 107.

In FIG. 5, a section that is constituted by the OB clamping circuit 101, the PGA 102, the ADC 103, and the DAC 106 will be called an analog front-end circuit (hereinafter referred to as an "AFE circuit") 100a. A section that is constituted by the LPF 104 and the black-level correction unit 105 will be called an OB clamping controller 100b.

An output signal from a sensor is input to the black-level correction device 100 shown in FIG. 5, and the OB clamping circuit 101 adds the sensor output to a correction value input from the DAC 106. This correction value is determined to have a value such that an output signal from the PGA 102 can effectively utilize the dynamic range of the ADC 103.

The PGA 102 then amplifies an output signal of the OB clamping circuit 101 in accordance with a predetermined gain and the ADC 103 converts the amplified signal into a digital signal. This digital signal is fed back to correct the black level.

The fed-back digital signal is input to the LPF 104, and, when a digital signal corresponding to a sensor output of a light-shielding region is input, the LPF 104 averages the digital signal.

The black-level correction unit 105 determines the difference between a digital signal output from the LPF 104 and a black-level target value (hereinafter referred to as an "OB target value") and outputs a correction value in accordance with the determined difference. Herein, the OB target value is a pre-set constant value or is appropriately determined by a microcomputer or the like.

Further, the correction value is input to the DAC 106 and the DAC 106 converts the correction value into an analog signal and outputs the signal to the OB clamping circuit 101.

The digital clamping circuit 107 also subtracts the correction value from the digital signal output from the ADC 103 and outputs the resulting signal as an output signal of the black-level correction device 100. Herein, the correction value that is subtracted may be externally given or may be internally determined. When the value is internally determined, it equals the average value (i.e., black level) of an output signal of the light-shielding region.

In the known black-level correction device 100, however, the black level in the AFE circuit 100a may be offset too high for the convenience of processing at the AFE circuit 100a. For example, for the purpose of using a region in which the linearity is favorable (a linear region) in the input/output characteristic of the PGA 102 in the AFE circuit 100a, the processing may be performed with the black level being increased by a predetermined value.

In this case, the offset amount of black level is subtracted by the digital clamping circuit 107 and a value less than the offset amount is clipped to "0" and is caused to serve as an output signal.

In such a case, since the dynamic range of a video signal is reduced by the offset amount of the black level, there is a problem in that a dynamic range that is inherently provided in the device cannot be effectively used.

An object of the present invention is to provide a digital clamping circuit and a digital clamping method which can effectively use the dynamic range of an output signal in black-level correction.

SUMMARY

To solve the above problem, the present invention provides a digital clamping circuit for clamping a digital processed signal, which is obtained by performing black-level correction processing (i.e., processing performed by a section that is constituted by an AFE circuit and an OB clamping controller) on a video signal that is output after image-capturing means receives reflection light from an object with a light-receiving surface, to be at a predetermined black level, the correction processing causing a black level to have a predetermined target value (an OB target value). The digital clamping circuit includes first clamping means (e.g., a clamping circuit 20 shown in FIG. 1) for subtracting a value indicating a black level in the processed signal from the processed signal, and amplifying means (e.g., a digital amplifier 30 shown in FIG. 1) for amplifying an output signal from the first clamping means by a predetermined gain.

That is, this arrangement can increase the dynamic range that has been reduced by an offset amount of the black level.

The amplifying means is also capable of processing a negative value, and the digital clamping circuit further includes second clamping means (e.g., a clamping circuit 40 shown in FIG. 1) for adding a positive correction value, to an output signal from the amplifying means, the positive correction value being smaller than the value indicating the black level.

That is, a negative value produced by processing at the first clamping means is effectively utilized, so that the linearity of an output signal in the vicinity of the value indicating the black level can be improved and thus image quality in the vicinity of the black level can be improved.

Figure 3:
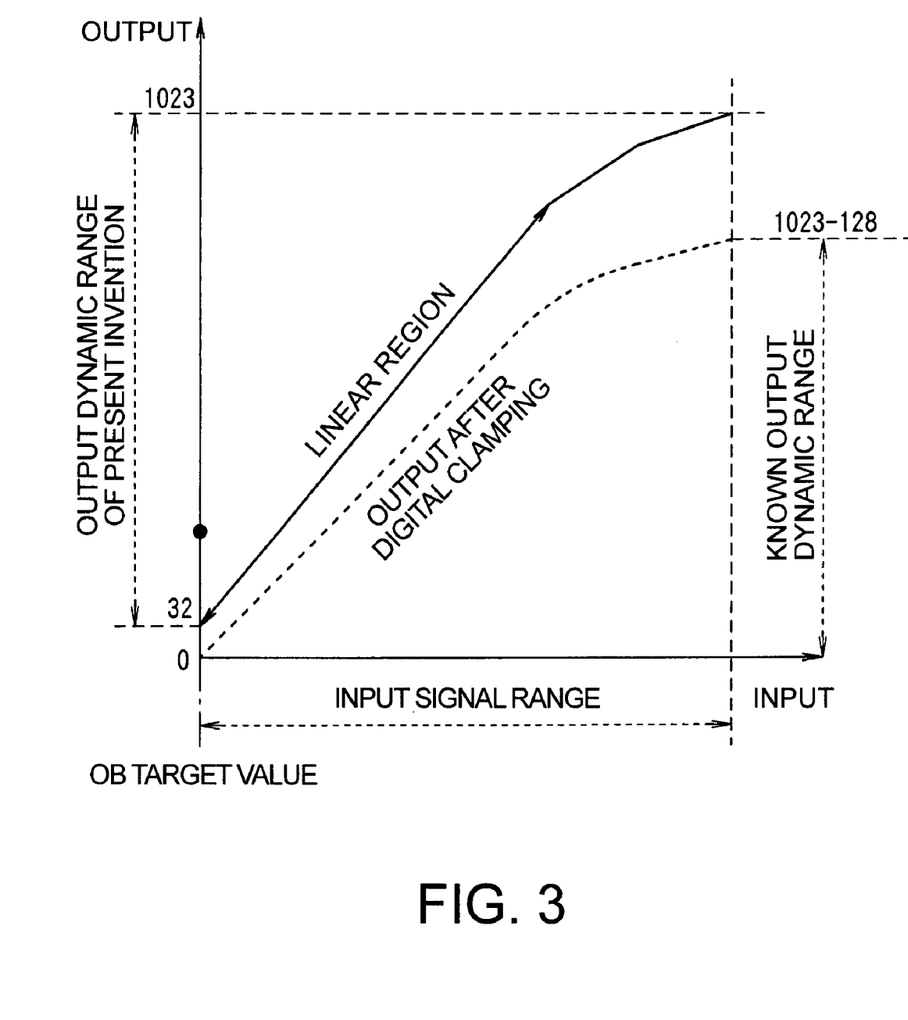
FIG. 3 is a graph showing input/output characteristics of clamping circuits 20 and 40 in the present invention.

Further, the amplifying means has a gain for causing an input dynamic range (e.g., the dynamic range of an output signal of the clamping circuit 20 shown in FIG. 3) that is a full range of the first clamping means after a range of the value indicating the black level is subtracted to be a full range (e.g., the dynamic range of an output signal of the digital amplifier 30 shown in FIG. 3) that is the output dynamic range of the first clamping means after a range of the correction value is subtracted.

That is, the gain of the amplifying means is given by the expression $(2^L-N)/(2^L-M)$, where "L" indicates the number of bits of an output signal from the first clamping means, "M" is a value indicating a black level, and "N" is a correction value.

The output signal is thus amplified to a dynamic range level that is inherently provided in the digital clamping circuit.

In addition, the amplifying means has a variable gain, and the digital clamping circuit further includes controlling means (e.g., an automatic brightness level controller 70 shown in FIG. 4) for performing control by associating a gain of the amplifying means with at least one of a shutter speed of the image-capturing means and a gain of an analog amplifier in the correction processing.

Namely, this arrangement allows control by associating portions related to the brightness of an image, thus making it possible to more appropriately correct the black level.

Further, the gain of the amplifying means is manually or automatically settable, and the controlling means controls at least one of the shutter speed of the image-capturing means and the gain of the analog amplifier in the correction processing in association with the set gain of the amplifying means.

Namely, the shutter speed of the image-capturing means and the gain of the analog amplifier in the correction processing are changed so as to correspond to the set gain of the amplifying means.

The present invention provides a digital clamping method for clamping a digital processed signal, which is obtained by performing correction processing on a video signal that is output after image-capturing means receives reflection light from an object with a light-receiving surface, to be at a predetermined black level, the correction processing causing a black level to have a predetermined target value. The digital clamping method includes a first clamping step of subtracting a value indicating a black level in the processed signal from the processed signal, and an amplifying step of amplifying an output signal in the clamping step by a predetermined gain.

In the digital clamping method according to the present invention, a negative value can be processed in the amplifying step, and the digital clamping method may further include another clamping means for adding a positive correction value, which is smaller than the value indicating the black level, to the output signal in the amplifying step.

Also, the amplifying step may have a gain for causing an input dynamic range that is an output dynamic range in the clamping step after a range of the value indicating the black level is subtracted to be an output dynamic range that is the output dynamic range in the clamping step after a range of the correction value is subtracted.

Further, the amplifying step may have a variable gain, and the control may be performed by associating the gain in the amplifying step with at least one of the shutter speed in the image-capturing means and the gain of the analog amplifier in the correction processing.

According to the present invention, the dynamic range that is reduced by subtraction of a value indicating a black level from a processed signal is increased by the amplifying means.

Thus, it is possible to effectively utilize the dynamic range of an output signal of a digital clamping circuit. Thus, processing that makes good use of a wider dynamic range can be performed in image processing at a subsequent stage, so that image quality can be improved.

DETAILED DESCRIPTION

A digital clamping circuit according an embodiment of the present invention will now be described in detail with reference to the drawings.

First, the configuration thereof will be described.

Figure 1:
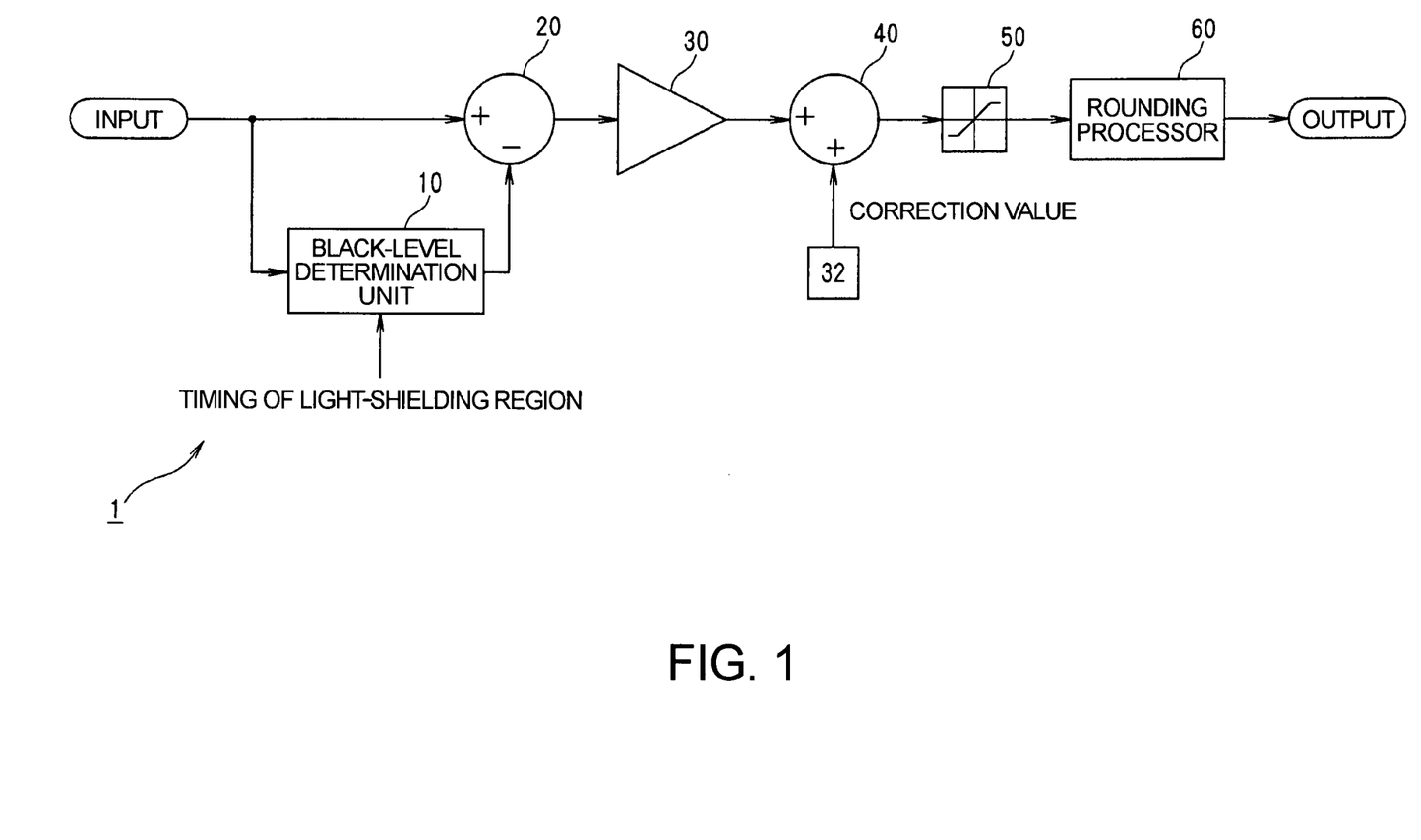
FIG. 1 is a block diagram showing the functional configuration of a digital clamping circuit 1 according to an embodiment of the present invention.

FIG. 1 is a block diagram showing the functional configuration of a digital clamping circuit 1 according to an embodiment. The digital clamping circuit 1 is provided in a device, such as an electronic camera, having an imaging sensor, and corrects an output signal of the imaging sensor and the black level of a captured image and also performs processing for effectively using the dynamic range of an output signal.

Referring to FIG. 1, the digital clamping circuit 1 includes a black-level determination unit 10, clamping circuits 20 and 40, a digital amplifier 30, a clipping circuit 50, and a rounding processor 60.

A circuit which includes the AFE circuit 100a and the OB clamping controller 100b in the known black-level correction device 100 shown in FIG. 5 is connected to a stage prior to the digital clamping circuit 1. Thus, a signal output from the sensor is processed by the AFE circuit 100a and the OB clamping controller 100b. The signal is thus subjected to OB-clamp processing in an analog state, so that a signal having a black level corrected to substantially the same value as a target value (an OB target value) is digitized and is input to the digital clamping circuit 1.

In FIG. 1, the black-level determination unit 10 averages a sensor output of a light-shielding region and outputs the processed result to the clamping circuit 20 as a black level in a digital value.

The black level determined by the black-level determination unit 10 is obtained by averaging the result of processing for correcting the black level by the circuit, which is constituted by the AFE circuit 100a and the OB clamping controller 100b, to a predetermined value.

Thus, the average value determined by the black-level determination unit 10 becomes substantially the same as the OB target value.

The clamping circuit 20 subtracts the black level input from the black-level determination unit 10 from an input signal. That is, the clamping circuit 20 subtracts the OB target value (about "128" herein) from an output signal to correct the brightness of an entire captured image.

In this case, although a negative value, which is meaningless as a value for indicating the brightness of a displayed image, may be produced as the result of the subtraction, the clamping circuit 20 does not clip the negative value but is adapted to process it as an effective value.

The use of a negative region as being effective in this manner can prevent the generation of an error in processing at a subsequent stage (which will be described below).

The digital amplifier 30 amplifies an output signal from the clamping circuit 20 by a predetermined gain to perform processing for increasing the dynamic range.

In general, an output signal from the digital clamping circuit 1 has a constant dynamic range, and the use of a wider permissible dynamic range can provide a higher-quality image.

On the other hand, in the known black-level correction, as described above, when the OB target value is high, there is a problem in that the intrinsic dynamic range cannot be effectively utilized.

Accordingly, in the present invention, the digital amplifier 30 amplifies an output signal from which a black level has been subtracted, to thereby increase the dynamic range.

Also, when such amplification is performed, a negative value is used as being effective in the clamping circuit 20.

The clamping circuit 40 adds a predetermined correction value to an output signal from the digital amplifier 30 and outputs the resulting signal to the clipping circuit 50.

The correction value that is added in this case is a value ("32" herein) smaller than the OB target value.

The clipping circuit 50 clips a negative portion of the output signal from the clamping circuit 40 and corrects it to "0".

The processing for adding the correction value in the clamping circuit 40 is the addition of a predetermined offset and this processing causes a value smaller than the absolute value of the correction value to be a positive value.

As a result, a value in a certain range which has been supposed to be clipped to "0" in the known black-level correction is processed as an effective positive value. This can increase the linearity of a value in the vicinity of "0" in the dynamic range of an output signal and also can improve image quality of a dark portion.

The rounding processor 60 performs rounding processing on an output signal from the clipping circuit 50 by, for example, rounding off or down.

That is, since the processing performed by the clamping circuits 20 and 40 and the digital amplifier 30 involves operation including an integral part and a decimal part, the rounding processor 60 performs rounding processing on the produced decimal part and outputs a signal as an integer.

The digital clamping circuit 1 serves as a digital processing system that is adapted to input a 10-bit integer.

Input/output characteristics of the digital clamping circuit 1 will now be described.

Figure 2:
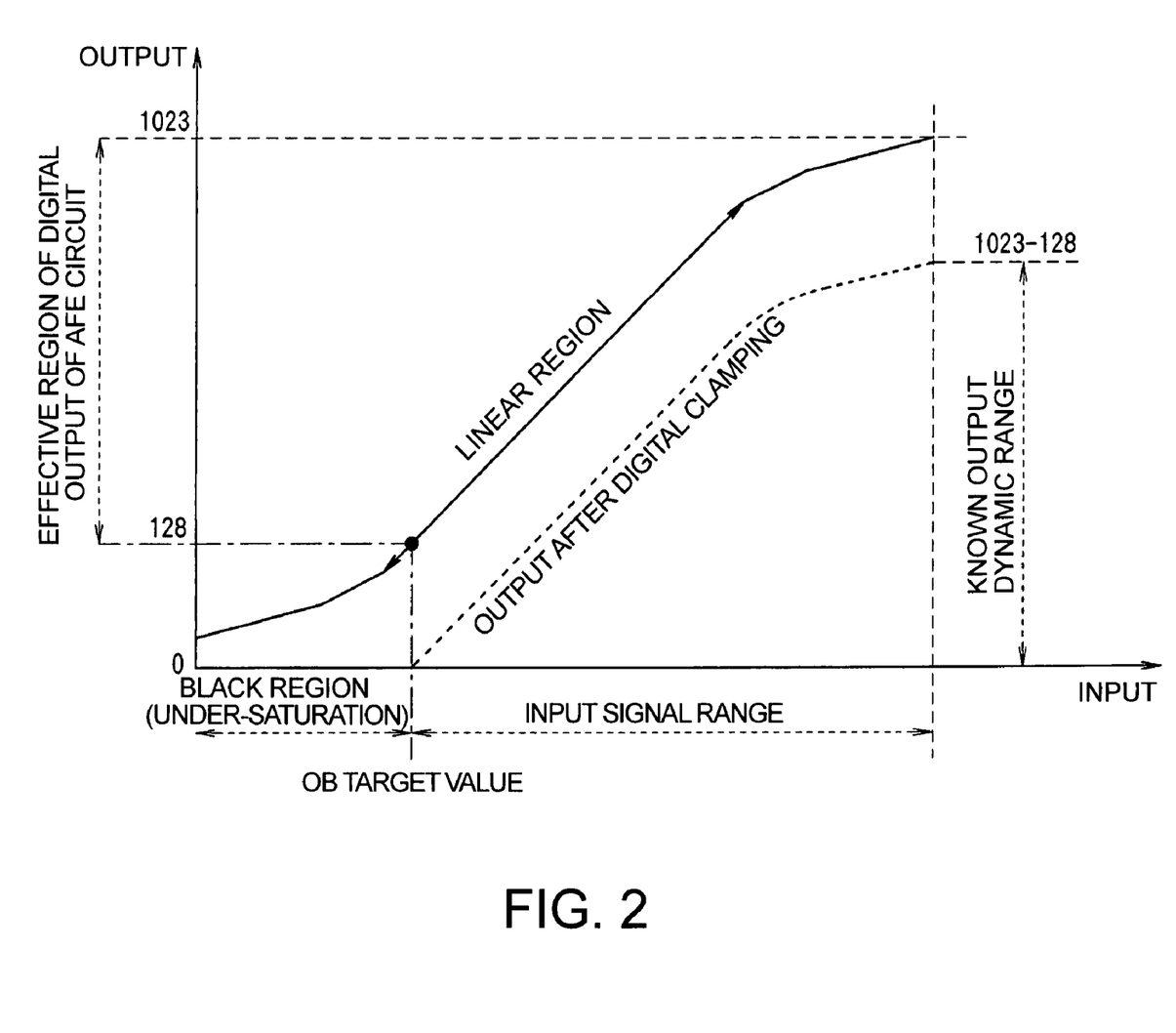
FIG. 2 is a graph showing input/output characteristics of a known black-level correction device 100.

FIG. 2 is a graph showing input/output characteristics of the known black-level correction device 100.

In FIG. 2, as indicated by the solid line, the input/output characteristic of the AFE circuit 100a shows a dynamic range of a value a little larger than "0" to "1023".

Further, in the input/output characteristic of the AFE circuit 100a, the center portion of the dynamic range exhibits a linear characteristic.

Thus, in the known black-level correction, a certain high value, such as "128", may be used as a black level (the OB target value in the AFE circuit 100a) for the purpose of using a linear region in the input/output characteristic of the AFE circuit 100a.

Further, in the digital clamping circuit 107, the black level is subtracted from the output signal from the AFE circuit 100a.

That is, the output signal from the digital clamping circuit 107 becomes as indicated by the dotted line in FIG. 2.

In this case, as shown in FIG. 2, since an effective region in the dynamic range of the output signal is reduced, there is a problem in that the dynamic range cannot be effectively utilized.

That is, when the black level is "128" with respect to the dynamic range "1024" of the output signal of the AFE circuit 100a, a dynamic range from which the black level has been subtracted becomes 1024−128=896.

Any value less than the black level of the output signal from the AFE circuit 100a becomes so-called "under-saturation of black". That is, these values are all clipped to "0" at the output of the digital clamping circuit 107.

On the other hand, in the present invention, an output signal having a reduced dynamic range is amplified by the digital amplifier 30, so that the dynamic range is increased.

FIG. 3 is a graph showing input/output characteristics of the clamping circuits 20 and 40 of the present invention. In FIG. 3, the dotted line indicates an output signal from the clamping circuit 20 and the solid line indicates an output signal from the clamping circuit 40.

In FIG. 3, as in the known configuration, the dynamic range of the output signal from the clamping circuit 20 decreases to "896".

On the other hand, since the output signal from the clamping. circuit 40 is amplified by a predetermined gain, the dynamic range thereof is increased from "32" to "1023".

For example, when the digital amplifier 30 performs amplification at a gain of 1.2, the dynamic range of "896" can be increased to 896×1.2≈1075, which is about a 20% improvement.

As described above, the correction value ("32" in this case) is added to the output signal from the digital amplifier 30.

As a result of such processing, compared to the known black-level correction, the dynamic range of an output signal is increased as given by the expression (1023−32)/(1023−128) =1.1(0.83 dB), so that the dynamic range is effectively utilized.

The operation will now be described.

An output signal from an AFE circuit corresponding to the AFE circuit 100a shown in FIG. 5 is input to the digital clamping circuit 1.

In this case, with respect to a variation in a black level based on power-supply voltage variation or temperature variation of an image-capturing element or the AFE circuit, the black level of the output signal, which is in the analog state, from the AFE circuit is corrected, so that the black level of the signal becomes substantially equal to the OB target value.

The output signal from the AFE circuit is input to the black-level determination unit 10 and the clamping circuit 20.

In turn, the black-level determination unit 10 determines a black level, which is input to the clamping circuit 20.

The clamping circuit 20 subtracts the black level from the output signal of the AFE circuit to correct the brightness of an entire image. That is, the clamping circuit 20 subtracts the black level from an image that is in a so-called "over-saturation of black" state to perform correction so that a black portion of the image has a predetermined brightness.

In this case, the clamping circuit 20 processes a negative value as being effective.

The output signal of the clamping circuit 20 is then amplified by the digital amplifier 30, so that the dynamic range is increased.

Next, the output signal of the digital amplifier 30 is input to the clamping circuit 40, and a correction value is added to the signal to thereby cause a certain negative value to become a positive value. That is, a part of a negative region of an output signal from the digital amplifier 30 is processed as being effective.

Lastly, the rounding processor 60 rounds the output signal to a predetermined value by using processing such as rounding off and outputs the resulting value as an output signal of the digital clamping circuit 1.

As described above, when subtracting a black level serving as a reference value from an output signal of the AFE circuit, the digital clamping circuit 1 according to the embodiment permits the production of a negative value, amplifies the dynamic range including the negative value to thereby increase the dynamic range, adds a predetermined correction value to the resulting signal, and performs clipping.

As a result, the dynamic range of the digital clamping circuit 1 is increased, so that the dynamic range of an output signal can be effectively utilized. That is, processing that makes good use of a wider dynamic range can. be performed in image processing at a subsequent stage, so that image quality can be improved.

Also, since the clamping circuit 20 processes a negative value as being effective, it is possible to avoid the event that the image quality is deteriorated due to non-linearity resulting from clipping when an output signal is amplified.

In addition, since clipping is performed after the addition of a predetermined correction value in the clamping circuit 40, the linearity of a value in the vicinity of "0" (i.e., a value in a region adjacent to black) in the output signal can be maintained.

In this embodiment, the arrangement may be such that the digital amplifier 30 is a digital programmable gain amplifier and an automatic brightness level controller for integrally controlling the gain of the PGA included in the AFE circuit, the shutter speed of the imaging sensor, and the gain of the digital amplifier 30 in accordance with an output signal from the clipping circuit 50 is provided, to correct the brightness level.

Figure 4:
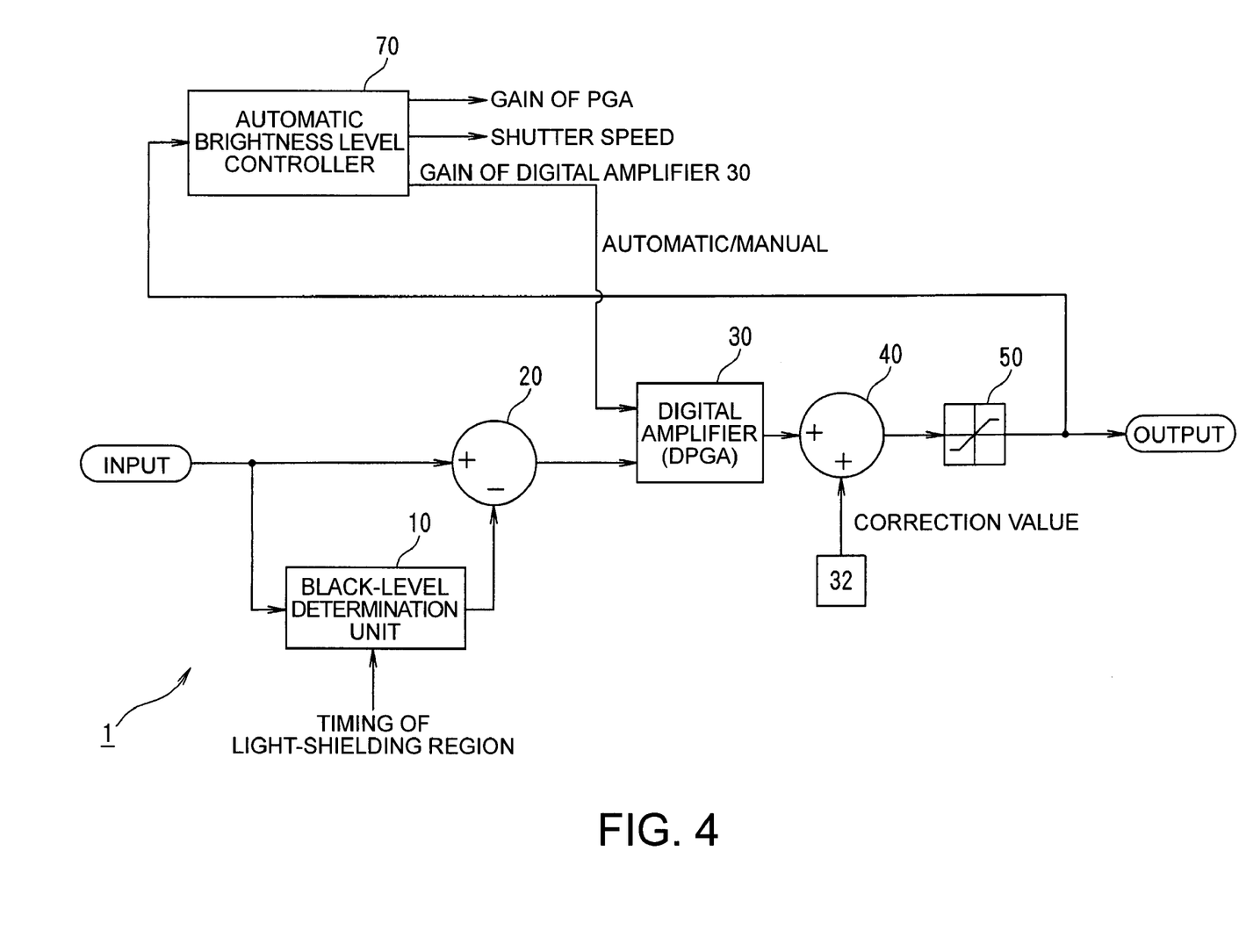
FIG. 4 is a block diagram showing the functional configuration when the digital clamping circuit 1 has an automatic brightness level controller.

FIG. 4 is a block diagram showing the functional configuration when the digital clamping circuit 1 has an automatic brightness level controller. While the rounding processor 60 is not shown in FIG. 4, the configuration in which a decimal part of an output signal of the clipping circuit 50 is rounded and the resulting signal is output as an integer is analogous to the case shown in FIG. 1

Referring to FIG. 4, an output signal of the clipping circuit 50 is input to an automatic brightness level controller 70, and, in accordance with the input signal, the automatic brightness level controller 70 changes the shutter speed and the gain of the PGA.

Further, in a case in which a brightness level cannot be appropriately corrected even when the shutter speed and the gain of the PGA are changed, the automatic brightness level controller 70 changes the gain of the digital amplifier 30 to correct the brightness level to an appropriate value.

With this arrangement, it is possible to perform control by associating the shutter speed, the gain of the PGA, and the gain of the digital amplifier 30 which affect the brightness level of an image. Thus, it is possible to more appropriately correct the brightness level.

Although the description hereinabove has been given of a case in which the shutter speed and the gain of the PGA are changed before the gain of the digital amplifier 30 is changed, the gain of the digital amplifier 30 may be changed before.

Also, although the description hereinabove has been given of a case in which the automatic brightness level controller 70 automatically changes the gain of the digital amplifier 30, the configuration may be such that the gain of the digital amplifier 30 can be optionally set by a user.

The entire disclosure of Japanese Patent Application No. 2003-024647 filed Jan. 31, 2003 is incorporated by reference.

What is claimed is:

1. A digital clamping circuit for clamping a digital processed signal to be at a predetermined black level, the digital processed signal being obtained by performing correction processing on a signal that is output after image-capturing means receives reflection light from an object with a light-receiving surface, the correction processing causing a black level to have a predetermined target value, the digital clamping circuit comprising:

first clamping means for subtracting a value indicating a black level in the processed signal from the processed signal;

digital amplifying means for amplifying an output signal from the first clamping means by a predetermined gain, wherein the output signal includes a negative value and the digital amplifying means amplifies the output signal including the negative value; and second clamping means for adding a positive correction value to an output signal from the digital amplifying means, the positive correction value being smaller than the value indicating the black level.

2. The digital clamping circuit according to claim 1, wherein the digital amplifying means has a gain causing an input dynamic range that is a full range of the first clamping means after a range of the value indicating the black level is subtracted to be an output dynamic range that is the full range of the first clamping means after a range of the correction value is subtracted.

3. A digital clamping circuit for clamping a digital processed signal to be at a predetermined black level, the digital processed signal being obtained by performing correction processing on a signal that is output after image-capturing means receives reflection light from an object with a light-receiving surface, the correction processing causing a black level to have a predetermined target value, the digital clamping circuit comprising:

first clamping means for subtracting a value indicating a black level in the processed signal from the processed signal; and digital amplifying means for amplifying an output signal from the first clamping means by a predetermined gain, wherein the digital amplifying means has a variable gain, and wherein the digital clamping circuit further comprises controlling means for performing control by associating a gain of the digital amplifying means with at least one of a shutter speed of the image-capturing means and a gain of an analog amplifier in the correction processing.

4. The digital clamping circuit according to claim 3, wherein the gain of the digital amplifying means is at least one of manually and automatically settable, and wherein the controlling means controls at least one of the shutter speed of the image-capturing means and the gain of the analog amplifier in the correction processing in association with the set gain of the digital amplifying means.

5. A digital clamping method for clamping a digital processed signal to be at a predetermined black level, the digital processed signal being obtained by performing correction processing on a signal that is output after image-capturing means receives reflection light from an object with a light-receiving surface, the correction processing causing a black level to have a predetermined target value, the digital clamping method comprising:

a first clamping step of subtracting a value indicating a black level in the processed signal from the processed signal;

a digital amplifying step of amplifying an output signal in the first clamping step by a predetermined gain, wherein the output signal includes a negative value and the digital amplifier amplifies the output signal including the negative value; and a second clamping step which adds a positive correction value to an output signal from the digital amplifier, the positive correction value being smaller than the value indicating the black level.

6. A digital clamping circuit for clamping a digital processed signal to be at a predetermined black level, the digital processed signal being obtained by performing a correction process on a signal that is output after an image-capturing device receives reflection light from an object with a light-receiving surface, the correction process causing a black level to have a predetermined target value, the digital clamping circuit comprising:

a first clamper which subtracts a value indicating a black level in the processed signal from the processed signal;

a digital amplifier which amplifies an output signal from the first clamper by a predetermined gain, wherein the output signal includes a negative value and the digital amplifier amplifies the output signal including the negative value; and a second damper which adds a positive correction value to an output signal from the digital amplifier, the positive correction value being smaller than the value indicating the black level.

7. The digital clamping circuit according to claim 6, wherein the digital amplifier has a gain causing an input dynamic range that is an output dynamic range of the first clamper after a range of the value indicating the black level is subtracted to be an output dynamic range that is the output dynamic range of the first clamper after a range of the correction value is subtracted.

8. A digital clamping circuit for clamping a digital processed signal to be at a predetermined black level, the digital processed signal being obtained by performing a correction process on a signal that is output after an image-capturing device receives reflection light from an object with a light-receiving surface, the correction process causing a black level to have a predetermined target value, the digital clamping circuit comprising:

a first clamper which subtracts a value indicating a black level in the processed signal from the processed signal; and digital amplifier which amplifies an output signal from the first clamper by a predetermined gain, wherein the digital amplifier has a variable gain, and wherein the digital clamping circuit further comprises a controller which associates a gain of the digital amplifier with at least one of a shutter speed of the image-capturing device and a gain of an analog amplifier in the correction process.

9. The digital clamping circuit according to claim 8, wherein the gain of the digital amplifier is at least one of manually and automatically settable, and wherein the controller controls at least one of the shutter speed of the image-capturing device and the gain of the analog amplifier in the correction process in association with the set gain of the digital amplifier.

10. A black level correction device comprising:

an analog front end (AFE) circuit that outputs a signal based on reflection light received from an object with a light-receiving surface;

an optical black (OB) clamping circuit that performs a correction process on the signal and outputs a digital processed signal, the correction process causing a black level to have a predetermined target value; and a digital clamping circuit for clamping the digital processed signal to be at a predetermined black level, the digital clamping circuit comprising:

a first clamper which subtracts a value indicating the black level in the processed signal from the processed signal;

a digital amplifier which amplifies an output signal from the first clamper by a predetermined gain, wherein the output signal includes a negative value and the digital amplifier amplifies the output signal including the negative value; and a second clamper which adds a positive correction value to an output signal from the digital amplifier, the positive correction value being smaller than the value indicating the black level.

* * * * *